C. A. BODDIE.
ELECTRICAL MEASURING INSTRUMENT.
APPLICATION FILED APR. 23, 1915.

1,290,492.  Patented Jan. 7, 1919.

WITNESSES:
R. J. Fitzgerald
J. M. Procter

INVENTOR
Clarence A. Boddie.
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,290,492.  Specification of Letters Patent.  Patented Jan. 7, 1919.

Application filed April 23, 1915. Serial No. 23,345.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to motor meters.

The object of my invention is to provide means for adapting a motor meter to operate correctly through a wide range of load.

Another object of my invention is to provide the magnetic circuit of a motor meter with means for deflecting a relatively large part of its magnetic flux through its armature under predetermined conditions.

Heretofore, performances of watthour meters of the induction type have not always been found satisfactory because the per cent. registration curves taken thereon for various loads did not approach a straight line of constant value. In such instruments the registration was incorrect when the load varied because the damping action varies as the square of the change in magnetic flux and the torque varies only directly as the change in magnetic flux.

I provide means for deflecting a relatively large part of the magnetic flux induced by the current winding through the armature when predetermined loads are impressed thereon, in order to increase the torque of the armature and thus overcome the damping effect on the armature at relatively great loads.

Figure 1:
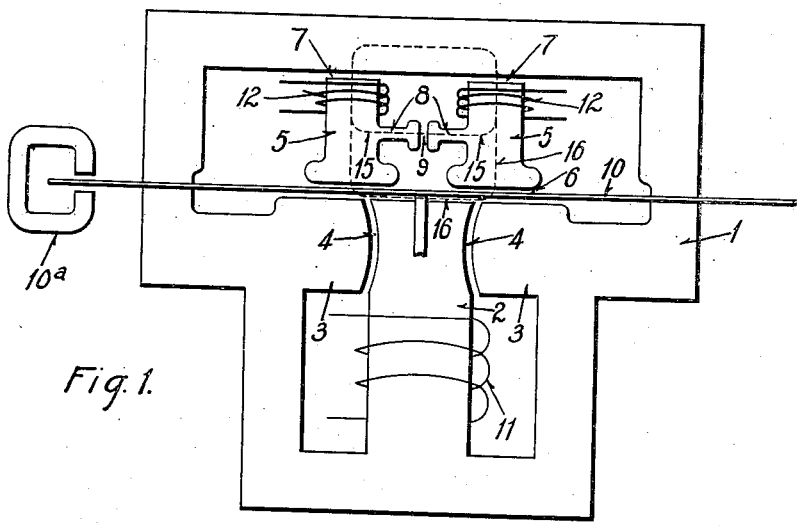
Figure 2:
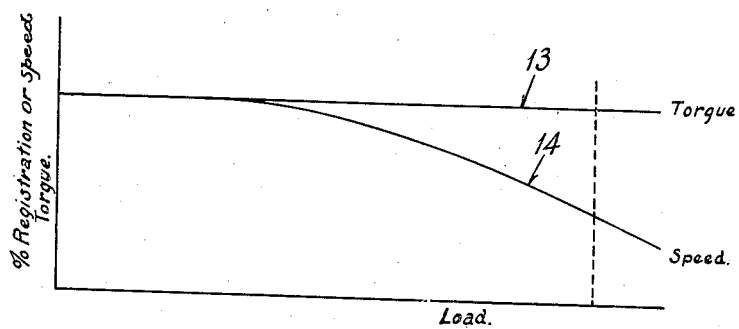
Figure 3:
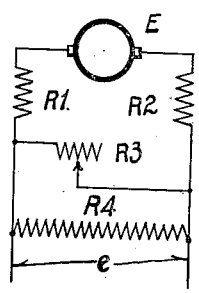

Figure 1 of the accompanying drawings is a diagrammatic view of a motor meter embodying my invention; Fig. 2 is a diagram illustrating the torque and per cent. registration curves of an ordinary motor meter, and Fig. 3 is a diagrammatic view of an electric circuit to be utilized in explaining the operation of my invention.

A laminated magnetizable core member 1 of a motor meter is provided with a central leg or member 2, two side members 3 that are spaced from the central member 2 by air gaps 4, and members 5 that are spaced from the central member 2 and its side members 3 by an air gap 6 and from the core member 1 by air gaps 7.

The members 5 are provided with lateral projections 8 that are separated by a relatively small air gap 9. The projections 8 are of relatively small cross section, with respect to the cross section of the members 5, so that, under predetermined conditions, they may become magnetically saturated, for reasons hereinafter more fully set forth.

An armature 10 is disposed in the air gap 6 to be acted upon by magnetic fluxes from a permanent damping magnet $10^a$, the central member 2, upon which is disposed a potential winding 11, and the members 5, upon which are disposed current windings 12.

The magnetic fluxes produced by the windings 11 and 12 cause the armature 10 to develop a torque that is proportional to the product of these two fluxes. When the armature rotates by reason of this torque, eddy currents are set up therein by the magnetic fluxes that produce the torque. The eddy currents that result from the movement of the armature 10 through the alternating magnetic field develop a retarding torque substantially as a retarding torque is developed by the movement of the armature in the field of the permanent magnet $10^a$. The retardation varies as the square of the change in the strength of the field, irrespective of whether the flux is alternating or permanent. The retardation caused by the movement of the armature through the current-winding flux is commonly termed series damping and that caused by the potential-winding flux is termed shunt damping.

It is evident that, although the torque developed in the armature is proportional to the true product of the current and potential fluxes, the speed does not increase in exactly this ratio but is reduced by an amount equal to the retardation or damping of the fluxes producing the motion. This retardation constitutes an error for which it is the object of my invention to compensate. Hence, it will be seen that the usual motor meter, while having a torque curve that is substantially indicated at 13, has a speed curve that is substantially indicated at 14 in Fig. 2.

The magnetic flux induced by the windings 12 tend to traverse two paths, as shown in Fig. 1 by the dotted lines 15 and 16. As the load increases upon the meter, more current traverses the windings 12 and, consequently, more flux tends to traverse each of the parallel paths. However, the projections 8 become magnetically saturated, under predetermined conditions, on account of their reduced cross section, and, instead of the flux being divided between the two paths in a definite ratio, as it would be if the members 8 were unsaturated, a greater portion of the flux will traverse the path indicated by dotted line 16, thus tending to increase the torque of the meter to counterbalance the effect of the increased retarding action and to produce a speed or per cent. registration curve that is substantially of the same shape as the torque curve 13 shown in Fig. 2 of the drawing.

The air gaps 7 in the magnetic circuit are necessary to the application of the principle of operation hereinbefore set forth. In order to understand the function of the gaps 7, reference may be made to Fig. 3 of the drawings which is a diagrammatic representation of the magnetic circuits by means of analogous electric symbols.

Assume a source of electric or magnetic potential E, supplying a circuit having resistances or reluctances $R_1$, $R_2$, $R_3$, and $R_4$, (hereinafter referred to as resistances) connected substantially as shown wherein resistances $R_1$ and $R_2$ may be considered analogous to the reluctance of the air gaps 7, resistance $R_3$ as analogous to the reluctance of the path 15 through the projections 8 and the air gap 9, and resistance $R_4$ as analogous to the reluctance of the path 16 through the main gap 6. The useful flux through the disk 10, or through resistance $R_4$, is proportional to the magnetic potential between the poles 5 divided by the reluctance, or $$\frac{e}{R_4}.$$

The potential $e$ is equal to the total applied magnetomotive force E less the potential drop through the resistances $R_1$, $R_2$, which is determined by the total flux or current multiplied by $(R_1+R_2)$. It is evident, therefore, that, if resistance $R_3$ is variable, the drop through resistances $R_1$ $R_2$ is variable. For any given value of applied electromotive force E, the flux through resistance $R_4$ may be increased by increasing resistance $R_3$. If resistances $R_1$ and $R_2$ were not introduced, the potential across resistance $R_4$ would always be equal to the applied electromotive force E, and, therefore, could not be varied by changing resistance $R_3$. In the circuit herein described, the value of resistance $R_3$ is made to vary automatically by the change in permeability of the projections 8. It is therefore evident that, if resistance $R_3$ increases automatically as the potential E is increased, the drop through resistance $R_1$, $R_2$ will be proportionately reduced and the potential $e$ will be increased at a greater rate than the applied electromotive force E increases.

By properly proportioning the circuit, the potential $e$ may be caused to increase at such a rate as to compensate for the retardation or drag errors hereinbefore set forth.

While I have shown my invention in its preferred form, I do not wish to be limited to the structure illustrated in this application, as many modifications may be made within the spirit and scope of the invention as set forth in the appended claims.

I claim as my invention:

1. In an electrical measuring instrument, the combination with a magnetizable core member of substantially the form of a hollow rectangle having an inwardly-extending central portion and inwardly-extending side portions spaced from each other by air gaps, of two magnetizable members spaced from the core member, from each other and from the central and side portions by air gaps.

2. An electrical measuring instrument comprising a magnetizable core of substantially the form of a hollow rectangle and magnetizable members spaced from each other and from the core by air gaps, said magnetizable members having projections thereon that are separated by an air gap and adapted to become saturated under predetermined conditions.

3. An electrical device comprising a magnetizable core member of substantially the form of a hollow rectangle having pole pieces separated therefrom and from each other, and a winding for the pole pieces, said pole pieces having projections thereon that are adapted to become saturated when the current traversing the winding reaches a predetermined relatively high value to cause the magnetomotive force drop across the faces of the pole pieces to vary disproportionately to the changes in the current above the predetermined relatively high value.

4. An electrical device comprising a magnetizable core constituting a substantially hollow rectangle, and two members spaced therefrom and from each other, said members having projections thereon that are separated by an air gap, said members being so arranged that the magnetic flux therebetween traverses two parallel paths, the air gaps and the projections being of such dimensions that the magnetomotive force drop across one path is adapted to increase disproportionately to the increase in the magnetic flux in the members.

5. In an electrical measuring instrument, the combination with a magnetizable core of substantially the form of a hollow rectangle having a central and side members spaced from each other by air gaps, of two members spaced from the central and side members and from the core by air gaps and having projections that are separated by a relatively small air gap.

6. In an electrical measuring instrument, the combination with a magnetizable core having a central and side members spaced from each other by air gaps, of two members spaced from the central and side members by air gaps and from another part of the magnetizable core by air gaps.

7. An electrical measuring instrument comprising a magnetizable core having a closed-magnetic-circuit outer portion, a central inwardly projecting portion, inwardly projecting side portions separated from the central portion by air gaps, and inwardly projecting members separated from the outer portion of the core and from the central and side portions by air gaps.

8. An electrical measuring instrument comprising a magnetizable core having a central upwardly projecting member, side members separated from the central member by air gaps, downwardly projecting members separated from the upper end of the core by air gaps and having projections that become magnetically saturated under predetermined conditions.

9. An electrical measuring instrument comprising a magnetizable core having a central upwardly projecting member, side members separated from the central member by air gaps, downwardly projecting members separated from the upper end of the core by air gaps and having projections that are separated by a relatively small air gap and become magnetically saturated under predetermined conditions.

10. An electrical device comprising a magnetizable core member of substantially the form of a hollow rectangle, and magnetizable pole pieces that are separated therefrom by air gaps, said pole pieces having projections thereon that are separated by a relatively small air gap.

11. An electrical device comprising a magnetizable core member of substantially the form of a hollow rectangle, and magnetizable pole pieces that are separated therefrom by air gaps, said pole pieces having projections thereon that are separated by a relatively small air gap and adapted to become saturated under predetermined conditions.

12. An electrical device comprising a magnetizable core member of substantially the form of a hollow rectangle, magnetizable pole pieces that are separated therefrom by air gaps, and means for magnetizing the pole pieces, said pole pieces having projections thereon, the said projections and the air gaps being so proportioned that the magnetomotive force drop between the faces of the pole pieces varies disproportionately to the change in flux therein.

13. A motor-meter comprising a magnetizable member, magnetizable pole pieces therefor separated therefrom by air gaps, and means for magnetizing the pole pieces, said pole pieces having projections thereon, said projections being adapted to become so saturated and the air gaps being of such dimensions that the magnetomotive forces drop between the pole pieces varies disproportionately to changes in the magnetizing force.

14. A motor-meter comprising a magnetizable core member, magnetizable pole pieces separated from said member by air gaps and means for coöperating with the air gaps to cause the magnetomotive force difference between the faces of the pole pieces to vary disproportionately to the magnetic flux that traverses the pole pieces.

15. A watthour meter comprising a main magnetizable core member having two pole pieces separated from each other and from the core member by air gaps, means for inducing flux in the pole pieces, said pole pieces having projections thereon that are separated by an air gap, the flux induced in the pole pieces being adapted to pass from one to the other over two parallel paths, one of which constitutes the projections thereon.

16. A watthour meter comprising a magnetizable core member having two pole pieces separated therefrom by air gaps, and a current winding for the said pole pieces, said pole pieces being of such shape that the flux induced in the pole pieces by the current winding divides into two parallel paths between the same, one path of which is adapted to become saturated under predetermined load conditions in the meter.

17. A watthour meter comprising a magnetizable core member having two pole pieces separated therefrom by air gaps, and a current winding for the said pole pieces, said pole pieces having projections thereon, whereby the flux induced in the pole pieces by the current winding divides into two parallel paths between the same, one path of which is adapted to become saturated when the load on the meter reaches a relatively high value to cause the flux that traverses the other path to increase disproportionately to the increase in load above the said relatively high value.

18. In a watthour meter, the combination with a main magnetizable core member, of two magnetizable members separated from the core member by air gaps, said members having projections thereon that are separated by an air gap, and a winding for the magnetizable members, the flux induced in the magnetizable members being adapted to pass from one to the other over two parallel paths, one of which constitutes the projections thereon.

In testimony whereof, I have hereunto subscribed my name this 7th day of April, 1915.

CLARENCE A. BODDIE.